(12) United States Patent
Chow et al.

(10) Patent No.: US 8,578,194 B2
(45) Date of Patent: Nov. 5, 2013

(54) GREEN MODE DATA BUFFER CONTROL

(75) Inventors: Sun Chow, Sunnyvale, CA (US);
Joanna (Yatian) Zhang, Milpitas, CA (US)

(73) Assignee: Broadcom Corporation, Irvine, CA (US)

( * ) Notice: Subject to any disclaimer, the term of this patent is extended or adjusted under 35 U.S.C. 154(b) by 672 days.

(21) Appl. No.: 12/819,854

(22) Filed: Jun. 21, 2010

(65) Prior Publication Data
US 2011/0314313 A1    Dec. 22, 2011

(51) Int. Cl.
*G06F 1/32* (2006.01)
*G06F 12/00* (2006.01)

(52) U.S. Cl.
USPC .......................................... 713/323; 711/154

(58) Field of Classification Search
USPC ......................................................... 713/323
See application file for complete search history.

(56) References Cited

U.S. PATENT DOCUMENTS

| | | | | |
|---|---|---|---|---|
| 5,928,365 A * | 7/1999 | Yoshida | ........................ | 713/324 |
| 7,100,013 B1 * | 8/2006 | de Waal | ........................ | 711/170 |
| 7,165,165 B2 * | 1/2007 | Woodbridge et al. | ......... | 711/219 |
| 7,702,940 B2 * | 4/2010 | Van Gassel et al. | .......... | 713/324 |
| 8,108,629 B2 * | 1/2012 | Shimizu et al. | ............... | 711/154 |

* cited by examiner

*Primary Examiner* — Kim Huynh
*Assistant Examiner* — Eric Chang
(74) *Attorney, Agent, or Firm* — Sterne, Kessler, Goldstein & Fox P.L.L.C.

(57) ABSTRACT

Embodiments provide improved modes of control of banked data buffer architectures. Embodiments provide modes of control of a central buffer pool (CBP) of a memory management unit (MMU). Embodiments are enabled by a cell free address pool (CFAP) module. The CFAP module may be implemented according to a banked structure. The CFAP module provides CBP/CFAP bank arbitration for selecting enqueue data cells. The CFAP module includes a green mode control module for controlling the power up/down of CBP banks according to expected data traffic through the MMU.

23 Claims, 5 Drawing Sheets

GREEN MODE DATA BUFFER CONTROL

BACKGROUND

1. Field of the Invention

The present invention relates generally to data buffers.

2. Background Art

Conventional shared data buffer memory designs are power inefficient as they maintain the entire data buffer powered on regardless of expected traffic. As a result, when the data buffer size increases, chip power consumption due to the data buffer becomes significant. Accordingly, there is a need for improved data buffer designs and modes of operation in order to save power.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. Generally, the drawing in which an element first appears is typically indicated by the leftmost digit(s) in the corresponding reference number.

DETAILED DESCRIPTION OF EMBODIMENTS

Central Buffer Pool (CBP) Embodiments

A memory management unit (MMU) is a central memory manager responsible for handling access to memory requested by the central processing unit (CPU). The MMU includes a data buffer space, commonly referred to as a central buffer pool (CBP), which is used in support of the MMU's operations. The MMU is typically connected to at least one ingress pipe (IP) and at least one egress pipe (EP). Embodiments of the present invention, as further described below, provide methods, systems, and computer program products for controlling the CBP of an MMU. For the purpose of illustration, example embodiments will be presented with respect to a CBP having a memory space of 10.2 Mbytes. As would be understood by a person of skill in the art based on the teachings herein, embodiments are not limited to the example embodiments provided herein.

Figure 1:
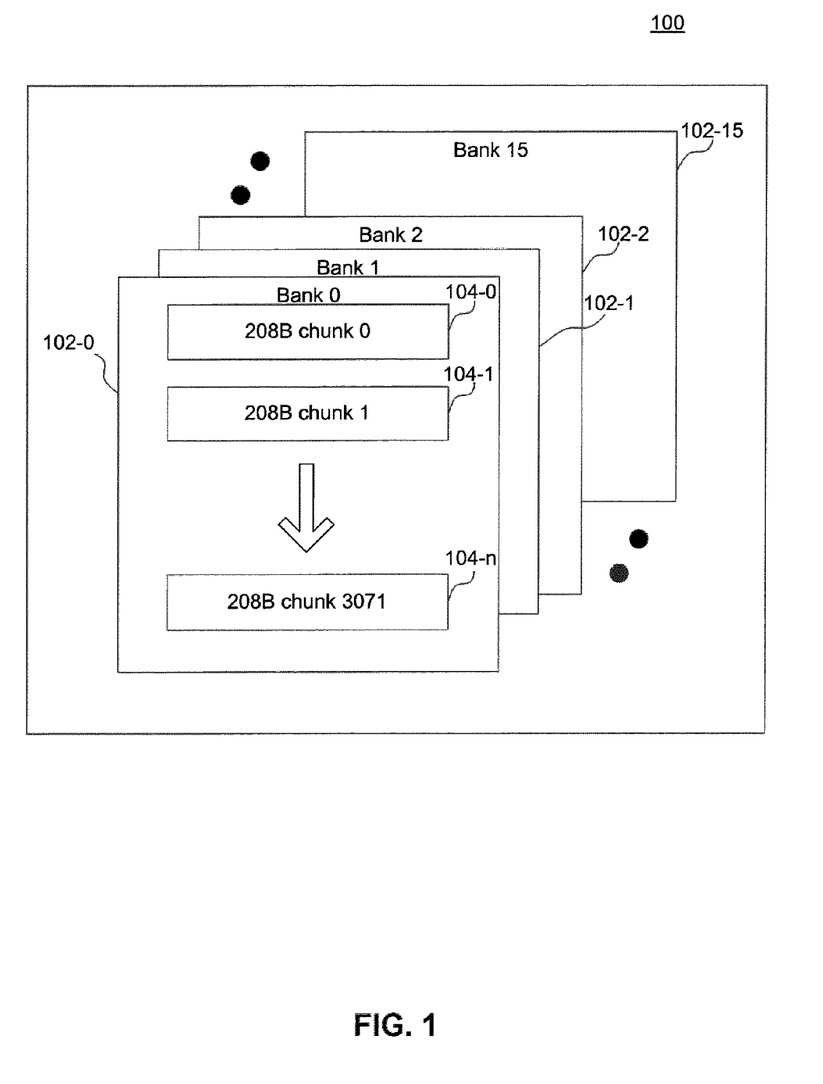
FIG. 1 illustrates an example central buffer pool (CBP) of an example memory management unit (MMU) according to an embodiment of the present invention.

FIG. 1 illustrates an example central buffer pool (CBP) 100 of an example memory management unit (MMU) according to an embodiment of the present invention. As shown in FIG. 1, example CBP 100 employs a "banked" data buffer architecture, which includes a plurality of memory banks 102-$\{0, \ldots, 15\}$. In an embodiment, memory banks 102 are separate physical memories (e.g., SRAMs). Each memory bank 102 comprises a plurality of data chunks or cells 104-$\{0, \ldots, n\}$. Each cell 104 provides 208 Bytes of memory space. Thus, with CBP 100 having a memory size of 10.2 Mbytes and 16 memory banks 102, CBP 100 can be viewed as an array with 48,000 elements (10.2 MB/208 B), which each element pointing to a 208 Bytes sized cell.

As would be understood by a person skilled in the art based on the teachings herein, embodiments are not limited to the example architecture of CBP 100 or to the numerical values of the different components provided above.

Cell Free Address Pool (CFAP) Embodiments

According to embodiments, the "banked" CBP structure described above with reference to FIG. 1 supports a data transfer rate of up to 640 Gbps. This is enabled by a module responsible for controlling access to the CBP, herein referred to as a Cell Free Address Pool (CFAP) module. In an embodiment, the CFAP module comprises a separate CFAP submodule per CBP bank of the CBP. Thus, the CFAP module can be viewed as also having a "banked" structure, with a plurality of CFAP banks each corresponding to a CBP bank of the CBP. Alternatively, the CFAP module can be viewed as an array of cell pointers, with each entry of the array pointing to a free (currently unused) cell (e.g., 208 Byte data chunk) of the CBP.

Each CFAP bank includes pointers to (unused) cells of its corresponding CBP bank. For example, in the case of a 10.2 MBytes CBP with 16 banks and 208 Bytes per cell, each CFAP bank initially includes pointers to approximately 3000 (~48,000 cells/16 banks) cell locations. As cells are allocated, their corresponding pointers in the CFAP bank are removed. When cells are freed up, their corresponding pointers are returned to the CFAP bank.

According to embodiments, the CFAP module enables one read command and one write command in each half cycle of the core chip clock, thus providing four CBP accesses per cycle. As further described below, the read command and the write command in each half cycle must be to different banks of the CBP. The address of the bank to be read from (read bank) is determined by the scheduled packet to be transmitted. The address of the bank to be written to (write bank) can be the address of any bank which is not full and that is not being read from at the same time.

Figure 2:
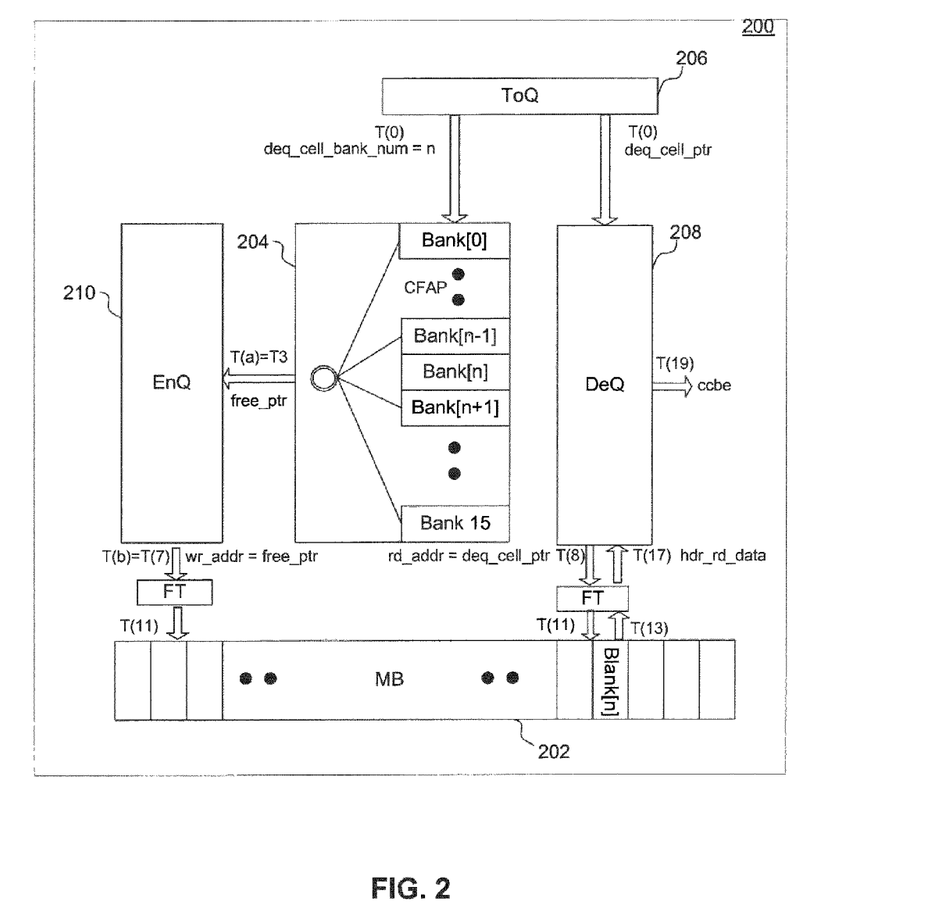
FIG. 2 illustrates an example cell pointer flow diagram of a banked data buffer according to an embodiment of the present invention.

FIG. 2 illustrates an example cell pointer flow diagram 200 of a banked data buffer according to an embodiment of the present invention. As shown in FIG. 2, example diagram 200 shows a banked, data buffer 202 comprising a plurality of banks, a CFAP module 204 having a plurality of CFAP banks (e.g., Bank[0], . . . , Bank15), a ToQ module/routine 206, a dequeue module/routine (DeQ) 208, and an enqueue module/routine (EnQ) 210. In particular, example diagram 200 illustrates simultaneous read and write commands being performed in a half cycle of the core chip clock. The read command is being performed by DeQ module/routine 208. The write command is being performed by EnQ module/routine 210.

At time T(0), ToQ 206 decides to dequeue a cell (i.e., read the cell content and return the cell to the CBP pool) to the egress pipe (EP) (not shown in FIG. 2). Thus, ToQ 206 provides a pointer to the cell to be dequeued (deq_cell_ptr) to DeQ module/routine 208. At the same time, ToQ 206 provides to CFAP module 204 the number of the CBP bank from which the cell is to be dequeued (deq_cell_bank_num).

At time T(a) (e.g, T(a)=T(3)), CFAP module 204 provides to EnQ module/routine 201 a pointer to a free cell from the CBP (free_ptr). In embodiments, CFAP module 204 selects the free cell pointer based on one or more of: the bank from which the cell is being dequeued by DeQ 208, the current states (e.g., active/inactive) of the CBP banks, and the cell occupancy limits of the CBP banks. For example, in an embodiment, CFAP module 204 selects the free cell pointer such that it corresponds to a cell from a CBP bank other than the CBP bank being read from (i.e., to which deq_cell_ptr points), and such that said other CBP bank is in an active state at the time of selection. In another embodiment, CFAP module 204 selects the free cell pointer such that it corresponds to a cell from the most occupied (not full) active CBP bank other than the CBP bank being read.

At time T(b) (e.g., T(b)=T(7)), EnQ 210 outputs an incoming data cell (received from the ingress pipe (IP)) to be enqueued (i.e., written) into the CBP at the location indexed by the free cell pointer selected by CFAP 204. DeQ 208 matches the total delay incurred at the EnQ side (i.e., CFAP 204 and EnQ 210) so that the dequeued cell is read out of the CBP at the same time.

Figure 3:
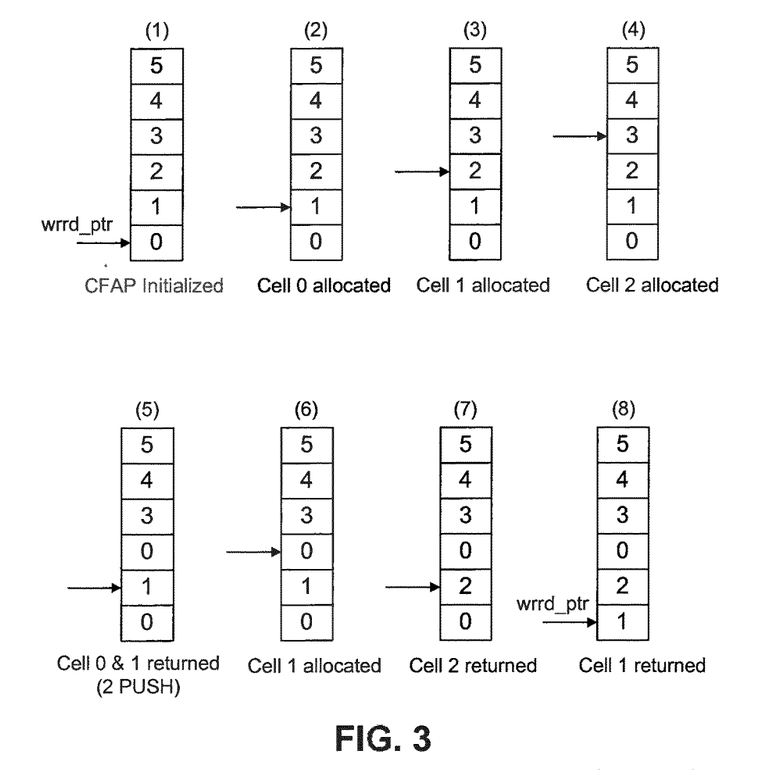
FIG. 3 illustrates an example Cell Free Address Pool (CFAP) stack algorithm according to an embodiment of the present invention.

FIG. 3 illustrates an example Cell Free Address Pool (CFAP) stack algorithm according to an embodiment of the present invention. The example algorithm shown in FIG. 3 can be used to implement the operation of the entire CFAP module or of a single CFAP bank. While the example algorithm of FIG. 3 shows a stack implementation (i.e., with push and pop operations, to simplify wrap-around logic), CFAP embodiments can also be implemented using a queue (with enqueue, dequeue operations). For the purpose of illustration, a CFAP pool size of 6 cells only is shown in FIG. 3. However, as would be understood by a person of skill in the art based on the teachings herein, the example stack algorithm shown in FIG. 3 can be applied to a CFAP pool of any size.

The example CFAP stack algorithm of FIG. 3 is illustrated by 8 sequential states of the CFAP pool. In state (1), the CFAP is initialized and all 6 CBP cells indexed by CFAP pointers 0-5 are free. The write/read pointer (wrrd_ptr) thus points to location 0 of the CFAP, which indicates that location 0 and all locations above it in the CFAP pool contains good/usable cell pointers (i.e., that point to unused CBP cells).

In state (2), cell 0 of the CBP indexed by the pointer at location 0 of the CFAP is allocated. The write/read pointer of the CFAP is thus updated to point to location 1 of the CFAP pool. Similarly, in states (3) and (4), cells 1 and 2 of the CBP indexed, respectively, by the pointers at locations 1 and 2 of the CFAP are allocated consecutively. The write/read pointer of the CFAP consecutively points to location 2 of the CFAP pool in state (3) and to location 3 of the CFAP pool in state (4).

In state (5), cells 0 and 1 of the CBP (which were allocated in states (2) and (3)) are returned (i.e., freed up) to the CBP. Accordingly, their corresponding pointers are also returned to the CFAP pool. In the example stack algorithm of FIG. 3, the pointers corresponding to cells 0 and 1 are PUSHed (i.e., with a PUSH operation) consecutively onto the CFAP stack, and the write/read pointer is updated to location 1 of the CFAP pool. Subsequently, in state (6), cell 1 of the CBP indexed by the pointer at location 1 of the CFAP is again allocated. The write/read pointer is updated to now point to location 0 of the CFAP pool. In state (7), cell 2 of the CBP (which was allocated in state (4)) is returned to the CBP. The pointer corresponding to cell 0 is PUSHed onto the CFAP stack, and the write/read pointer is updated to point to location 2 of the CFAP pool. Finally, in state (8), cell 1 of the CBP (which was allocated in state (6)) is returned to the CBP. The pointer corresponding to cell 1 is PUSHed onto the CFAP stack, and the write/read pointer is updated to point to location 1 of the CFAP pool. Thus, the CFAP pool returns to the same state as in state (1) with all 6 CBP cells indexed by CFAP pointers 0-5 available.

As illustrated in FIG. 3, during operation, CBP cells will not necessarily be returned in the same order that they were allocated. As such, CFAP pointers will not maintain the same order in the CFAP stack as in the initialization state. For example, referring to FIG. 3, while location 0 of the CFAP stack always points to the same physical CBP cell address (when the CBP cell is available), location 0 occupies different positions in the CFAP stack in states (1) and state (8), for example.

Example CFAP Bank Arbitration Implementation

According to an embodiment, the MMU is connected to two IPs and two EPs (i.e., two pipe implementation). Since read and write commands in each half cycle memory access must be to different banks, the CFAP module needs to select one CBP bank per pipe other than the one being determined by the read command. In a 16 CBP bank implementation, the CFAP thus arbitrates among 15 CBP banks to select two CBP banks for the write commands per cycle. However, nothing precludes that the same CBP bank is selected for both pipes.

In an embodiment, when more than one CBP bank choice exists, the CFAP selects the active CBP bank with the least CFAP free cell pointers left. Accordingly, an active CBP bank can be fully utilized before switching to another CBP bank. The factors that determine whether a CBP bank is included in CFAP bank arbitration include the bank number of the current cell being dequeued, whether or not the CFAP bank free cell pointer is valid (i.e., the CFAP cell pointer that would be selected from the CFAP pool if the CBP bank is selected); and whether or not the CBP bank is active. If all 16 CFAP banks are disqualified, no valid free cell pointer can be used to enqueue a cell into CBP.

Figure 4:
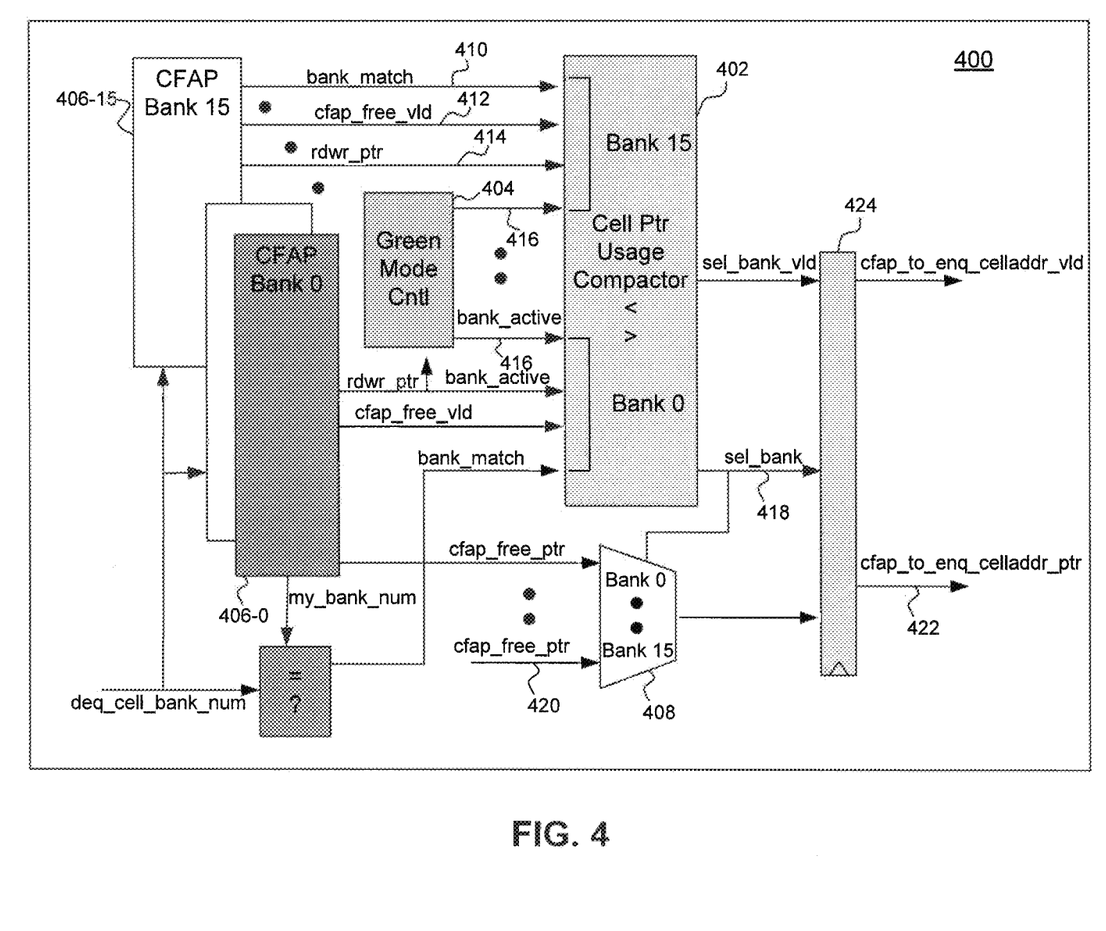
FIG. 4 illustrates an example implementation of CFAP bank arbitration according to an embodiment of the present invention.

FIG. 4 illustrates an example implementation 400 of CFAP bank arbitration according to an embodiment of the present invention. As shown in FIG. 4, example implementation 400 includes an arbitration module 402, a green mode control module 404, and a plurality of CFAP banks 406-{0, . . . , 15}.

Arbitration module 402 receives for each CFAP bank 406 a plurality of signals that are used in determining whether the CFAP bank qualifies for arbitration for writing data. In particular, arbitration module 402 receives for each CFAP bank a bank_match signal 410, a cfap_free_vld signal 412, a rdwr_ptr signal 414, and a bank_active signal 416.

Bank_match signal 410 indicates whether or not the CFAP bank matches the CFAP bank of the cell being dequeued in the same half clock cycle. If bank_match signal 410 is true, the corresponding CFAP bank is disqualified from arbitration and cannot be selected by arbitration module 402.

Cfap_free_vld signal 412 indicates whether or not the next free cell pointer of the CFAP bank is valid. To be eligible for bank arbitration, the next free cell pointer of a CFAP bank must be valid.

Rdwr_ptr signal 414 represents the next free cell pointer of the CFAP bank that would be selected from the CFAP bank. As described above with respect to FIG. 3, the rdwr_ptr (or wrrd_ptr) is updated as cells from the corresponding CBP bank are allocated/returned. Since CFAP banks are implemented using push-pop stacks, rdwr_ptr signal 414 represents the stack pointer address.

Bank_active signal 416 indicates whether or not the CBP/CFAP bank is active. A CBP bank must be active at the time of arbitration in order for its corresponding CFAP bank be eligible for bank arbitration. In an embodiment, as shown in FIG. 4, bank_active signal 416 is received by arbitration module 402 from green mode control module 404. In an embodiment, green mode control module 404 generates a bank_active signal 416 for each CFAP bank based on rdwr_ptr signal 414 of the CFAP bank.

Bank arbitration module 402 selects one bank from the qualified CFAP banks (i.e., active, valid free cell pointer, not dequeue bank) to be used for enqueueing the incoming cell. In an embodiment, arbitration module 402 selects the CFAP bank with the least free pointers left in the pool among the qualified CFAP banks. In a push-pop stack CFAP implementation, the CFAP bank with the least free pointers left in the pool is the CFAP bank with the highest stack pointer address. Thus, arbitration module 402 compares the stack pointer addresses of qualified CFAP banks to select the winner of the bank arbitration.

Bank arbitration module 402 outputs a sel_bank control signal 418 which indicates the arbitration selected CFAP bank. Sel_bank control signal 418 controls a multiplexer 408 having as inputs cfap_free_ptr signals 420. Cfap_free_ptr signals 420 represent the next free cell pointers from each of CFAP banks 406. Multiplexer 408 outputs one of signals 420 based on sel_bank control signal 418. The output signal, which represents a pointer to the enqueue cell, is then provided (via an output module 424) as cfap_to_enq_celladdr_ptr signal 422 to the EnQ module/routine.

Green Mode Control

As described above, the CFAP module may include a green mode control module (e.g., green mode control module 404). The green mode control module assists in bank arbitration as described above with reference to FIG. 4. Additionally, the green mode control module implements a power saving mode (green mode) to reduce power consumption of the CBP banks. In particular, the green mode control module ensures that only a necessary number of CBP banks (out of the total available CBP banks) are active at any given time. In an embodiment, the number of active CBP banks is a function of real time data traffic passing through the CBP.

According to embodiments, the green mode control module determines which CBP banks are turned on/off at any given time. Further, the green mode control module determines when an additional CBP bank needs to be turned to sustain the data traffic passing through the CBP, and when a currently active but empty CBP bank is turned off due to lack of data traffic. Accordingly, the population of CBP banks that are powered-up and ready for use is dynamically adjusted based on data traffic, so that a minimum number are kept in operation in order to reduce/minimize power consumption.

In an embodiment, the green mode control module monitors the utilization of all active CFAP banks (which corresponds to the utilization of CBP banks) to determine when to power up an inactive bank or power down an active bank. The green mode control module powers up an additional CBP bank when the number of active CFAP banks with utilization limits below a first utilization limit becomes less than two. In an embodiment, a "bank full" flag is associated with each CFAP bank, and the "bank full" flag is changed from 0 to 1 when the CFAP bank utilization exceeds the first utilization limit. In an embodiment, the CFAP bank utilization is indicated by the CFAP stack pointer. Thus, the green mode control module powers up an additional CBP bank when the following condition is true: the "bank full" flag of an active CFAP bank changes from 0 to 1; and less than two active CFAP banks have "bank full" flags equal to 0.

The green mode control module powers down an active CBP bank when the number of active CFAP banks with utilization limits below a second utilization limit becomes at least two and the active CBP bank is empty. The second utilization limit may be the same as or lower than the first utilization limit. In an embodiment, the "bank full" flag of an active CFAP is changed from 1 to 0 when the CFAP bank utilization falls below the second utilization limit. Thus, the green mode control module powers down an active CBP bank when the following condition is true: the utilization of the active CBP bank is 0 (all pointers are free); and at least two other active CFAP banks have "bank full" flags equal to 0.

In embodiments, the first utilization limit is programmable and determined according to expected data traffic. In particular, the first utilization limit is selected so as to ensure that when an additional CBP bank is powered up according to the condition described above, the additional CBP becomes active before the currently active CBP banks can become completely full. It is noted that, typically, a CBP bank does not become active immediately upon power up, but requires a fixed delay before it becomes active and operational. On the other hand, there is no delay between the time an active CBP is powered down and the time it becomes inactive.

An exemplary embodiment of green mode control is described below with reference to FIG. 5. In particular, FIG. 5 depicts 9 sequential states ((1) through (9)) showing CBP bank utilization/activity in a 16 bank CBP, controlled by a CFAP with green mode control.

Figure 5:
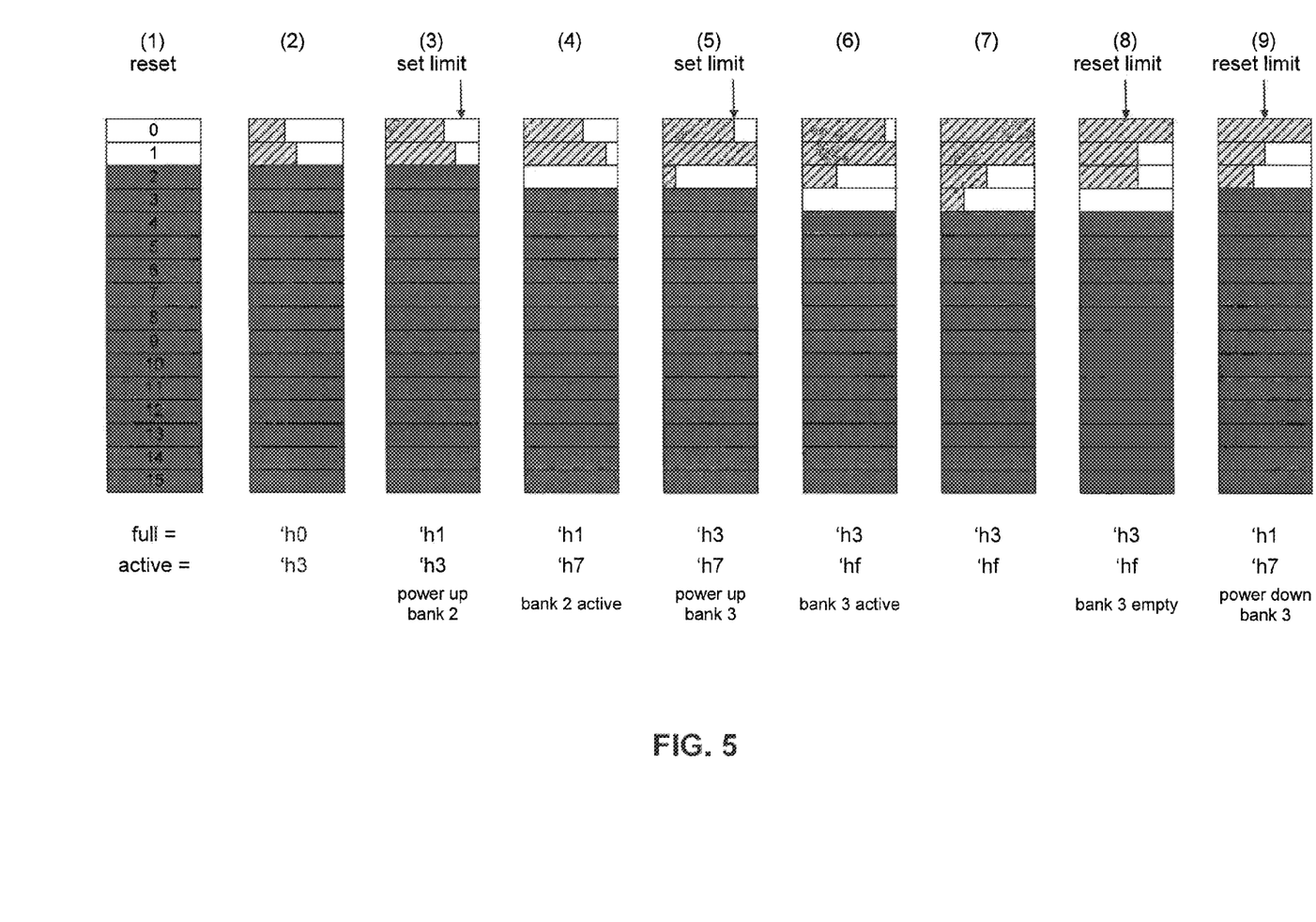
FIG. 5 illustrates an example power save CBP mode according to an embodiment of the present invention.

State (1) in FIG. 5 represents the reset state. In an embodiment, the MMU has two pipes, and thus requires a minimum of two active and not full CFAP banks to supply two valid free cell pointers in every cycle. Thus, at reset, only two CBP banks (banks 0 and 1) are required to be in active (power up) mode upon reset. The remaining banks (2-15) are inactive (idle or sleep mode). CBP banks 0 and 1 are empty at reset.

State (2) shows CBP banks 0 and 1 having been used to enqueue incoming cells and with respective limits of cell utilization. Banks 2-15 remain inactive in state (2). The limits of cell occupancy of banks 0 and 1 are not high enough in state (2) to necessitate that a third CBP be activated by the green mode control module.

In state (3), the utilization limit of bank 1 has exceeded the first utilization limit (set limit). The "bank full" flag of bank 1 is changed from 0 to 1. With less than two banks having "bank full" flags equal to 0, the green mode control module determines that an additional CBP bank must be powered in state (3).

In state (4), bank 2 which was powered up in state (3) has become active. The green mode control module continues to utilize bank 1 ahead of bank 0 because bank 1 has less free cell pointers left in the pool.

In state (5), bank 2 has become full and bank 1 has reached the first utilization limit. The green mode control module thus determines that an additional CBP bank must be turned on in state (5).

In state (6), bank 3 which was powered up in state (5) has become active. The green mode control module continues to utilize bank 0 ahead of bank 2 because bank 0 has less free cell pointers left in the pool.

In state (7), bank 0 has become full. However, both banks 2 and 3 remain below the first utilization limit. Thus, no additional CBP need to be turned on in state (7).

In state (8), bank 0 remains full. However, the utilizations of banks 1 and 3 have decreased. In particular, bank 3 has become empty. Yet, only bank 2 (other than bank 3) has a "bank full" flag equal to zero, and thus bank 3 cannot be powered down in state (8).

Finally, in state (9), the utilization of bank 1 has fallen below the second utilization limit (reset limit), triggering the "bank full" flag of bank 1 to be changed from 1 to 0. With at least two other active CBP banks (banks 1 and 2) having a "bank full" flag equal to zero, bank 3 which is empty can be turned off in state (9).

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present invention should not be limited by any of the above-described exemplary embodiments, but should be defined only in accordance with the following claims and their equivalents.

What is claimed is:

1. A method of controlling a data buffer having a plurality of data banks, comprising:
   monitoring respective utilization limits of active data banks of the data buffer;
   powering on an inactive data bank of the data buffer when a number of active data banks with utilization limits below a first utilization limit becomes below a first threshold; and
   powering down an active data bank of the data buffer when the active data bank is empty and a number of active data with utilization limits below a second utilization limit becomes equal to or greater than a second threshold.

2. The method of claim 1, wherein the data buffer includes a central buffer pool (CBP) of a memory management unit (MMU).

3. The method of claim 2, wherein monitoring said respective utilization limits of said active data banks of the data buffer comprises monitoring respective utilization limits of cell free address pool (CFAP) banks of a CFAP module of the MMU, said CFAP banks corresponding respectively to said active data banks.

4. The method of claim 3, wherein monitoring said respective utilization limits of said CFAP banks comprises monitoring respective stack pointers of said CFAP banks.

5. The method of claim 4, wherein said respective stack pointers of said CFAP banks indicate respective numbers of free cell pointers remaining in said CFAP banks.

6. The method of claim 1, wherein said first threshold is equal to two.

7. The method of claim 1, further comprising:
   associating a bank full flag with each active data bank of the plurality of data banks; wherein said bank full flag is changed from 0 to 1 when a utilization limit of its associated active data bank exceeds the first utilization limit.

8. The method of claim 7, wherein powering on said inactive data bank of the data buffer comprises powering on said inactive data bank when the bank full flag of an active data bank changes from 0 to 1 and when a number of active data banks with bank full flags equal to 0 becomes below the first threshold.

9. The method of claim 7, wherein said bank full flag is changed from 1 to 0 when the utilization limit of its associated active data bank falls below the second utilization limit.

10. The method of claim 9, wherein powering down said active data bank of the data buffer comprises powering down said active data bank when the active data bank is empty and a number of active data banks with bank full flags equal to 0 becomes at least equal to the second threshold.

11. The method of claim 1, wherein the second utilization limit is equal to the first utilization limit.

12. The method of claim 1, wherein the second utilization limit is lower than the first utilization limit.

13. The method of claim 1, wherein the second threshold is equal to the first threshold.

14. The method of claim 1, wherein the second threshold is equal to two.

15. The method of claim 1, wherein the first utilization limit is programmable.

16. The method of claim 1, wherein the first utilization limit is selected according to expected data traffic through the data buffer.

17. The method of claim 1, further comprising:
   receiving incoming data to be stored in the data buffer; and
   selecting a data bank from said active banks having a maximum utilization limit to store said incoming data therein.

18. A banked data buffer, comprising:
   a plurality of data banks, each of said data banks including a plurality of data cells; and
   a power save module configured to power on an inactive data bank of said plurality of data banks when a number of active data banks with utilization limits below a first utilization limit becomes below a first threshold; and to power down an active data bank of said plurality of data banks when the active data bank is empty and a number of active data banks with utilization limits below a second utilization limit becomes equal to or greater than a second threshold.

19. The banked data buffer of claim 18, wherein the power save module is configured to monitor respective utilization limits of said plurality of data banks.

20. The banked data buffer of claim 18, further comprising:
   a plurality of address pointer banks, each of said address pointer banks corresponding to a respective data bank of the plurality of data banks and comprising a set of address pointers to free data cells of said respective bank.

21. The banked data buffer of claim 18, wherein the first utilization limit is programmable.

22. The banked data buffer of claim 18, wherein the first threshold is equal to two.

23. The banked data buffer of claim 18, wherein the first utilization limit is selected according to expected data traffic through the data buffer.

* * * * *

UNITED STATES PATENT AND TRADEMARK OFFICE
CERTIFICATE OF CORRECTION

| | | |
|---|---|---|
| PATENT NO. | : 8,578,194 B2 | Page 1 of 1 |
| APPLICATION NO. | : 12/819854 | |
| DATED | : November 5, 2013 | |
| INVENTOR(S) | : Chow et al. | |

It is certified that error appears in the above-identified patent and that said Letters Patent is hereby corrected as shown below:

In the Claims

Column 7, lines 34-35 "number of active data with" should be replaced with --number of active data banks with--.

Signed and Sealed this
Fourth Day of February, 2014

Michelle K. Lee
*Deputy Director of the United States Patent and Trademark Office*